(12) United States Patent
Tamura et al.

(10) Patent No.: US 6,893,084 B2
(45) Date of Patent: May 17, 2005

(54) GLASS PANEL ARRANGEMENT FOR AUTOMOTIVE SUN ROOF SYSTEMS

(75) Inventors: Michio Tamura, Wako (JP); Tatsuya Ohara, Wako (JP); Masaharu Ohnishi, Wako (JP); Kohichi Hotta, Tochigi (JP)

(73) Assignees: Honda Giken Kogyo Kabushiki Kaisha (JP); Yachiyo Kogyo Kabushiki Kaisha (DE)

( * ) Notice: Subject to any disclaimer, the term of this patent is extended or adjusted under 35 U.S.C. 154(b) by 0 days.

(21) Appl. No.: 10/300,457

(22) Filed: Nov. 19, 2002

(65) Prior Publication Data

US 2003/0137166 A1 Jul. 24, 2003

(30) Foreign Application Priority Data

Jan. 21, 2002 (JP) ......................................... 2002-011374

(51) Int. Cl.⁷ ................................................. B60J 7/043
(52) U.S. Cl. ................................................. 296/216.09
(58) Field of Search ........................ 296/216.01, 216.06, 296/216.09

(56) References Cited

U.S. PATENT DOCUMENTS

| | | | | | |
|---|---|---|---|---|---|
| 4,738,482 | A | * | 4/1988 | Bohm et al. | 296/216.09 |
| 5,050,928 | A | * | 9/1991 | Bohm et al. | 296/216.09 |
| 5,170,587 | A | * | 12/1992 | Nakatani et al. | 296/216.09 |
| 5,516,186 | A | * | 5/1996 | Scherf et al. | 296/216.09 |
| 5,779,301 | A | * | 7/1998 | Ito | 296/216.09 |
| 5,992,928 | A | * | 11/1999 | Kato et al. | 296/216.09 |
| 6,079,771 | A | * | 6/2000 | Brandner et al. | 296/216.09 |
| 6,099,779 | A | | 8/2000 | Brandner et al. | 264/242 |
| 6,273,500 | B1 | * | 8/2001 | Boersma et al. | 296/216.09 |
| 6,283,542 | B1 | * | 9/2001 | P.ang.tz | 296/211 |
| 6,491,341 | B2 | * | 12/2002 | Grimm et al. | 296/216.09 |
| 6,540,289 | B2 | * | 4/2003 | Bergmiller et al. | 296/216.09 |

FOREIGN PATENT DOCUMENTS

JP 401215622 * 8/1989 ............ 296/216.09

* cited by examiner

Primary Examiner—Dennis H. Pedder
(74) Attorney, Agent, or Firm—Marger Johnson & McCollom, P.C.

(57) ABSTRACT

In a glass panel arrangement for automotive sun roof systems having a weather strip frame which is disposed substantially flush with the glass panel, a support frame made of metallic material and attached to a lower surface of the glass panel along a peripheral part of the glass panel is provided with an outer extension for supporting a part of the weather strip frame extending away from the edge of the glass panel from below so as to resist the tendency for the weather strip frame to get detached from the outer periphery of the glass panel. Therefore, the weather strip frame can be made of plastic material which has a relatively low affinity with the glass panel. In particular, if the outer extension is provided with an upwardly directed flange, not only the retaining force of the outer extension is improved but also the bending rigidity of the outer extension is improved.

17 Claims, 2 Drawing Sheets

GLASS PANEL ARRANGEMENT FOR AUTOMOTIVE SUN ROOF SYSTEMS

TECHNICAL FIELD

The present invention relates to a glass panel arrangement for automotive sun roof systems, and in particular to a glass panel arrangement including a glass panel for selectively closing an opening provided in a fixed roof panel of a motor vehicle, a weather strip frame made of elastomeric material and insert molded on a peripheral edge of the glass panel, and a support frame made of more rigid material and attached to a lower surface of the glass panel along a peripheral part of the glass panel.

BACKGROUND OF THE INVENTION

A glass panel for automotive sun roof systems fitted with a weather strip frame made of elastomeric material and insert molded on a peripheral edge of the glass panel, and a support frame made of metallic material and attached to a lower surface of the glass panel along a peripheral part of the glass panel is well known in the art as disclosed in U.S. Pat. No. 6,099,779. In such an arrangement, it is preferable to avoid the weather strip frame from projecting out of the profile of the roof of the vehicle body, and thereby provide a flush surface. It not only improves the aesthetic quality of the roof panel but also minimizes the aerodynamically induced noises.

The attachment of the weather strip frame to the edge of the glass panel conventionally relied on the bonding force derived from the affinity between the materials of the weather strip frame and glass panel. The weather strip frame typically consists of a weather strip retaining frame which is insert molded onto the peripheral edge of the glass panel, and a weather strip retained by the weather strip retaining frame.

When tilting up/down the glass panel and/or slide opening/closing the glass panel, the outer peripheral part of the weather strip frame inevitably deforms by being dragged on the opposing surface of the roof panel. This deformation tends to pull the weather strip frame away from the edge of the glass panel, and repeated cycles of deformation may eventually cause the weather strip frame to be detached from the glass panel. To avoid this from occurring, it is conceivable to apply a primer to the peripheral part of the glass panel, but it complicates the assembly process, and may create a problem in quality control.

BRIEF SUMMARY OF THE INVENTION

In view of such problems of the prior art, a primary object of the present invention is to provide an improved glass panel arrangement for automotive sun roof systems which can provide a flush outer surface while ensuring a secure attachment of a weather strip to the outer edge of the glass panel.

A second object of the present invention is to provide an improved glass panel arrangement for automotive sun roof systems which can provide a flush outer surface while allowing the use of elastomeric material having a relatively low affinity to the glass panel such as PVC for the weather strip frame.

A third object of the present invention is to provide an improved glass panel arrangement for automotive sun roof systems which can provide a flush outer surface without requiring any application of a primer to the peripheral part of the glass panel to securely attach the weather strip frame to the peripheral edge of the glass panel.

According to the present invention, such objects can be accomplished by providing a glass panel arrangement for automotive sun roof systems, comprising: a glass panel for selectively closing an opening provided in a fixed roof panel of a motor vehicle; a weather strip frame made of elastomeric material and insert molded on a peripheral edge of the glass panel; and a support frame made of a relatively rigid material and attached to a lower surface of the glass panel along a peripheral part of the glass; the support frame being provided with an outer extension for supporting a part of the weather strip frame extending away from the edge of the glass panel.

Because the outer extension of the support frame supports the part of the weather strip frame extending away from the edge of the glass panel from below, the weather strip frame is prevented from being pulled away from the glass panel. This is particularly important when the weather strip frame defines a substantially flush surface in relation to the glass panel. Therefore, the weather strip frame may be made of material having a relatively low affinity to the glass panel, such as PVC, which otherwise demonstrates a favorable property. Also, the need to apply a primer to the glass panel to ensure a secure attachment between the weather strip frame and glass panel may be eliminated.

In particular, if the support frame is provided with an upwardly directed flange along an outer periphery of the outer extension and the weather strip frame is provided with a groove for receiving the flange, not only the bending rigidity of the outer extension is improved but also the retaining force of the outer extension is improved.

According to a preferred embodiment of the present invention, the weather strip frame comprises a weather strip retaining frame which is insert molded on the peripheral edge of the glass panel, and a weather strip retained by the weather strip retaining frame at a base end thereof, the weather strip retaining frame being made of a more rigid material than the weather strip.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
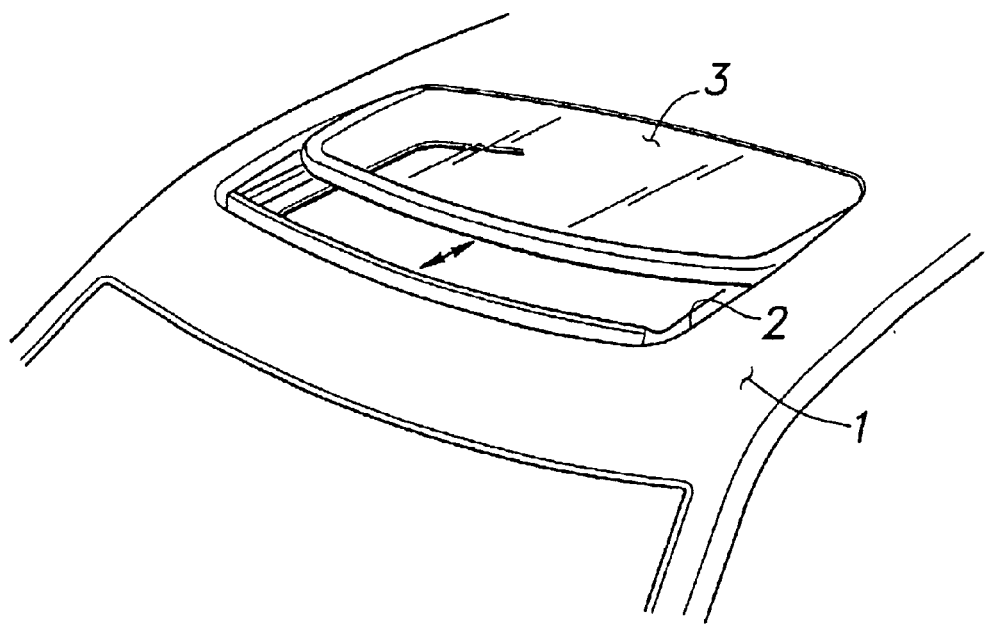
FIG. 1 is a fragmentary perspective view of an automotive sun roof system to which the present invention is applied.

Referring to FIG. 1, the sun roof system embodying the present invention comprises a substantially rectangular opening 2 formed in a fixed roof panel 1 of a motor vehicle, and a moveable panel 3 having a complementary shape that fits into the opening 2 and adapted to selectively close the opening 2 as described hereinafter. The moveable panel 3 comprises a glass panel 4, a support frame 5, a weather strip retaining frame 6 and a weather strip 7.

The support frame 5 consists of a channel member formed by stamp forming sheet metal made of such material as steel, and extending along the outer periphery of the glass panel 4 on the lower surface thereof. The support frame 5 includes a first engagement portion 5a extending along the inner periphery thereof and bent from the main part of the support frame 5 toward the glass panel 4, a second engagement portion 5b extending along a middle part thereof and bent from the main part of the support frame 5 toward the glass panel 4, both of which are attached to the lower surface of the glass panel 4 with a bonding agent 8. To the support frame 5 are attached slide shoes (not shown in the drawings) for engaging guide rails (not shown in the drawings) provided in the fixed roof panel 1, and a cam or link mechanism (not shown in the drawings) for effecting tilt and slide movements of the moveable panel 3.

The weather strip retaining frame 6 is made of plastic material, and is integrally attached to the outer periphery of the glass panel 4 by insert molding. The weather strip frame defines a substantially flush surface in relation to the glass panel 4. The outer periphery of the weather strip retaining frame 6 is provided with a groove 9 for retaining the weather strip 7. The weather strip 7 comprises an engagement portion 7a made of relatively soft material and defining a hollow cross section, and a retaining portion 7b made of relatively hard material and defining a mushroom-shaped cross section adapted to be fitted into the groove 9 of the weather strip retaining frame 6. The weather strip 7 is formed by extruding elastomeric material. The inner periphery of the weather strip retaining frame 6 serves as a dam member for the bonding agent 8 for the second engagement portion 5b of the support frame 5. An annular dam member 10 extends along the inner periphery of the support frame 5 to serve as a dam for the bonding agent 8 for the first engagement portion 5a of the support frame 5.

Figure 2:
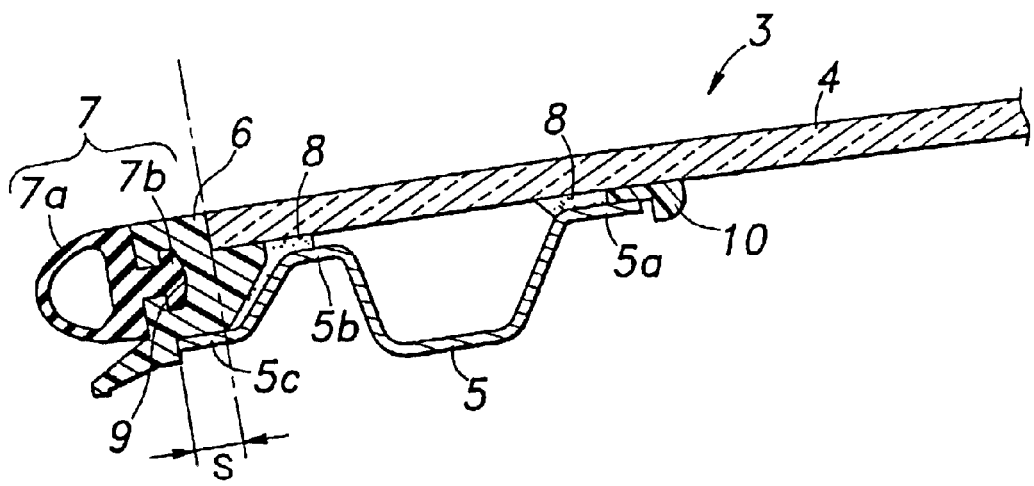
FIG. 2 is a sectional view of a peripheral part of a glass panel arrangement embodying the present invention.

The weather strip 7 attached to the weather strip retaining frame 6 tends to be subjected to a vertical force as the glass panel tilts up or slides open/close. Such forces tend to pull the weather strip retaining frame 6 away from the outer periphery of the glass panel 4. Therefore, according to the illustrated embodiment, the support frame 5 is provided with an outer extension 5c extending from the outer edge of the glass panel 4 (by distance S as shown in FIG. 2) along the outer periphery thereof. The outer extension 5c extends under the weather strip retaining frame 6 to support the vertical force acting on the weather strip retaining frame 6 from below. Thus, the outer extension 5c of the support frame effectively prevents the weather strip retaining frame 6 from being detached from the outer periphery of the glass panel 4.

The favorable action of the outer extension 5c allows the use of such material as PVC which may have a low affinity to the glass panel but otherwise demonstrates a favorable property as the material for the weather strip retaining frame 6. More specifically, PVC is known to have a relatively poor affinity with glass, and has therefore been considered as being an unsuitable molding material for insert molding glass due to poor attachment between them. On the other hand, PVC is also known to have a strong resistance against weathering, and a favorable capability to be molded. It has been proposed to apply a primer to the glass panel before insert molding the weather strip retaining member to improve attachment between them, but the present invention eliminates such a need, and it contributes to the simplification and cost reduction of the manufacturing process.

Figure 3:
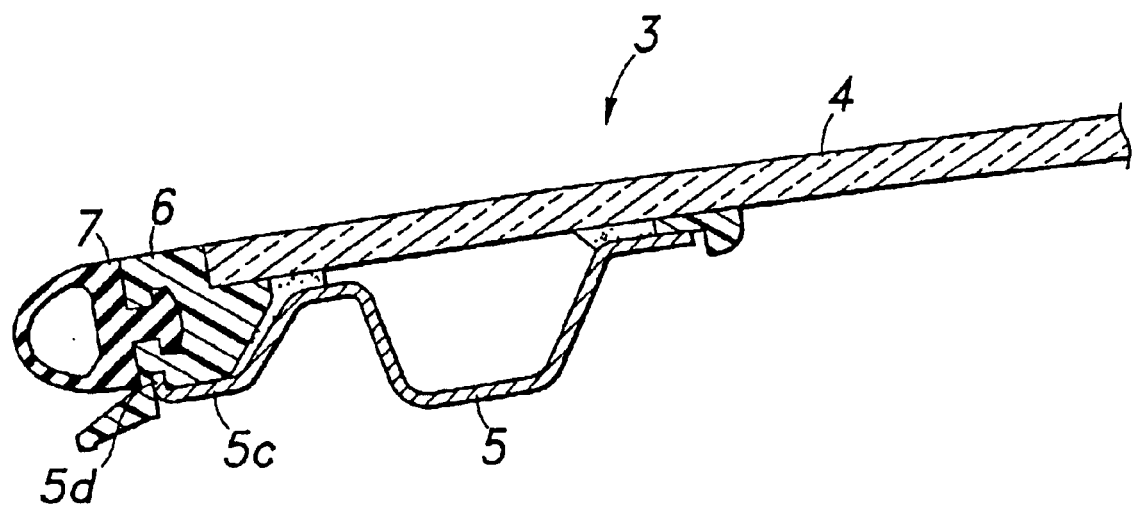
FIG. 3 is a view similar to FIG. 2 showing a second embodiment of the present invention.

FIG. 3 shows a second embodiment of the present invention. In this embodiment, the outermost periphery of the support frame 5 is provided with an upwardly directed flange 5d which fits into a corresponding groove provided in the weather strip retaining frame 6. This arrangement additionally provides a resistance against the weather strip retaining frame 6 to be detached laterally away from the edge of the glass panel 4. The flange 5d also increases the resistance of the extension 5c to bending deformation. The flange 5d thus not only enhances the engagement between the weather strip retaining frame 6 and support frame 5 but also increases the bending rigidity of the outer extension 5c of the support frame 5. These factors ensure an effective prevention of the detachment of the weather strip retaining frame 6 and an excessive deformation thereof.

Thus, according to the illustrated embodiments, the outer extension of the support frame supports the weather strip retaining member from below, and thereby resist the tendency for the weather strip retaining member to get detached from the outer periphery of the glass panel. Therefore, the weather strip retaining member can be made of plastic material which has a relatively low affinity with the glass panel. In particular, if the outer extension is provided with an upwardly directed flange, not only the retaining force of the outer extension is improved but also the bending rigidity of the outer extension is improved.

Although the present invention has been described in terms of preferred embodiments thereof, it is obvious to a person skilled in the art that various alterations and modifications are possible without departing from the scope of the present invention which is set forth in the appended claims.

What is claimed is:

1. A glass panel arrangement for automotive sun roof systems, comprising:

a glass panel for selectively closing an opening provided in a fixed roof panel of a motor vehicle;

a weather strip frame made of elastomeric material and insert molded on a peripheral edge of said glass panel, said weather strip frame abutting only a lateral end surface and a peripheral lower surface of said glass panel and having an upper surface substantially flush with an upper surface of said glass panel; and a support frame made of sheet metal and attached to a lower surface of said glass panel along a peripheral part of said glass panel;

said support frame being provided with a first engagement portion (5a) extending along an inner periphery of said support frame and attached to a lower surface of said glass panel (4) with a bonding agent, a second engagement portion (5b) extending along a middle part of said support frame and attached to the peripheral lower surface of said glass panel (4) adjoining the weather strip frame with a bonding agent, a channel portion provided between said first and second engagement portions and bent therefrom away from a major plane of said glass panel defining a channel having a concave side facing said glass panel, and an outer extension (5c) bent from said second engagement portion away from a major plane of said glass panel and extending laterally away from and beyond the edge of said glass panel for supporting a part of said weather strip frame.

2. A glass panel arrangement for automotive sun roof systems according to claim 1, wherein said weather strip frame comprises a weather strip retaining frame which is insert molded on said peripheral edge of said glass panel, and a weather strip retained by said weather strip retaining frame at a base thereof, said weather strip retaining frame being made of a more rigid material than said weather strip.

3. A glass panel arrangement for automotive sun roof systems according to claim 2, wherein said weather strip retaining frame is made of PVC.

4. A glass panel arrangement for automotive sun roof systems according to claim 1, wherein said weather strip frame comprises a part made of PVC.

5. A glass panel arrangement for automotive sun roof systems according to claim 1, wherein said weather strip frame defines a substantially flush surface in relation to said glass panel.

6. A glass panel arrangement for automotive sun roof systems, comprising:
- a glass panel for selectively closing an opening provided in a fixed roof panel of a motor vehicle, said glass panel being provided with a uniformly flat upper surface, a lower face, and a lateral edge surface;
- a weather strip retaining frame made of PVC material and insert molded on the lateral edge surface of the glass panel, said weather strip retaining frame being provided with an upper surface flush with the flat upper surface of the glass panel and engaging only the lateral edge surface and lower face of the glass panel;
- a weather strip made of elastomeric material and retained by an outer side face of the weather strip retaining frame at a base end thereof, the weather strip retaining frame being made of a more rigid material than the weather strip; and
- a support frame made of sheet metal and attached to the lower surface of the glass panel along a peripheral part of the glass panel;
- said support frame being provided with a first engagement portion (5a) extending along an inner periphery of said support frame and attached to a lower surface of said glass panel (4) with a bonding agent, a second engagement portion (5b) extending along a middle part of said support frame and attached to a lower surface of said glass panel (4) with a bonding agent, a channel portion provided between said first and second engagement portions and bent therefrom away from a major plane of said glass panel defining a channel having a concave side facing said glass panel, and an outer extension (5c) bent from said second engagement portion away from a major plane of said glass panel and extending laterally away from and beyond the edge of said glass panel for supporting a part of said weather strip retaining frame against the lower surface of said glass panel.

7. A glass panel arrangement for automotive sun roof systems according to claim 6, wherein said support frame further comprises an upwardly directed flange along an outer periphery of said outer extension.

8. A glass panel arrangement for automotive sun roof systems according to claim 7, wherein the weather strip retaining frame is provided with a groove for receiving said upwardly directed flange.

9. A glass panel arrangement for automotive sun roof systems according to claim 6, wherein the weather strip retaining frame is provided with a groove along an outer side thereof, and said base end of the weather strip is adapted to be retained by said groove.

10. A glass panel arrangement for automotive sun roof systems according to claim 1, wherein said support frame further comprises an upwardly directed flange along an outer periphery of said outer extension.

11. A glass panel arrangement for automotive sun roof systems according to claim 10, wherein said weather strip frame is provided with a groove for receiving said upwardly directed flange (5d).

12. A glass panel arrangement for automotive sun roof systems according to claim 6, wherein said weather strip is provided with a projection, and said weather strip retaining frame is provided with a corresponding groove adapted to receive said projection.

13. A glass panel arrangement for automotive sun roof systems according to claim 12, wherein said outer extension of said support frame extends at least partly under said projection.

14. A glass panel arrangement for automotive sun roof systems according to claim 12, wherein said projection of said weather strip is provided with an enlarged portion, and said groove of said weather strip retaining frame is provided with a corresponding enlarged portion, said outer extension of said support frame extending at least partly under said enlarged portions.

15. A glass pane arrangement for automotive sun roof systems, comprising:
- a glass panel for selectively closing an opening provided in a fixed roof panel of a motor vehicle;
- a weather strip frame made of PVC and insert molded on a peripheral edge of said glass panel, said weather strip frame abutting only a lateral end surface and a peripheral lower surface of said glass panel and having an upper surface substantially flush with an upper surface of said glass panel; and
- a support frame made of sheet metal and attached to a lower surface of said glass panel along a peripheral part of said glass panel;
- said support frame being provided with a first engagement portion (5a) extending along an inner periphery of said support frame and attached to a lower surface of said glass panel (4) with a bonding agent which is provided separately from the weather strip frame, a second engagement portion (5b) extending along a middle part of said support frame and attached to a lower surface of said glass panel (4) with a bonding agent which is provided separately from the weather strip frame, a channel portion provided between said first and second engagement portions and bent therefrom away from a major plane of said glass panel defining a channel having a concave side facing said glass panel, and an outer extension (5c) bent from said second engagement portion away from a major plane of said glass panel and extending laterally away from and beyond the edge of said glass panel for supporting a part of said weather strip frame.

16. A glass panel arrangement for automotive sun roof systems according to claim 15, wherein said support frame further comprises an upwardly directed flange along an outer periphery of said outer extension.

17. A glass panel arrangement for automotive sun roof systems according to claim 15, wherein said weather strip frame is provided with a groove for receiving said upwardly directed flange (5d).

* * * * *